(12) United States Patent
Drobek et al.

(10) Patent No.: US 10,002,204 B2
(45) Date of Patent: Jun. 19, 2018

(54) AUTOMATED ENTERPRISE DYNAMICS SYSTEM

(71) Applicant: SAP SE, Walldorf (DE)

(72) Inventors: Marc Drobek, Belfast (GB); Wasif Gilani, Newtownabby (GB); David Redlich, Belfast (GB); Thomas Molka, Belfast (GB)

(73) Assignee: SAP SE, Walldorf (DE)

( * ) Notice: Subject to any disclaimer, the term of this patent is extended or adjusted under 35 U.S.C. 154(b) by 573 days.

(21) Appl. No.: 14/716,161

(22) Filed: May 19, 2015

(65) Prior Publication Data

US 2016/0342707 A1    Nov. 24, 2016

(51) Int. Cl.
*G06F 17/30* (2006.01)
*G06Q 10/06* (2012.01)
*G06Q 10/10* (2012.01)

(52) U.S. Cl.
CPC ... *G06F 17/30958* (2013.01); *G06Q 10/0633* (2013.01); *G06Q 10/0637* (2013.01); *G06Q 10/10* (2013.01)

(58) Field of Classification Search
CPC .................................... G06F 17/30958
USPC ........................................ 707/746
See application file for complete search history.

(56) References Cited

U.S. PATENT DOCUMENTS

| | | | | |
|---|---|---|---|---|
| 8,364,829 B2 * | 1/2013 | Mogul | ...................... | G06F 15/16 709/229 |
| 2012/0143815 A1 * | 6/2012 | Lozano | ...................... | G06N 5/04 706/58 |
| 2016/0148103 A1 * | 5/2016 | Sarrafzadeh | ............. | G06N 5/04 706/46 |

OTHER PUBLICATIONS

"Developing System Dynamics Models From Causal Loop Diagrams", By: Thomas Binder; Published 2004; http://www.inb.uni-luebeck.de/publikationen/pdfs/BiVoBeHaSv04.pdf.*

"Developing System Dynamics Models From Causal Loop Diagrams"; By: Thomas Binder; 2004 http://citeseerx.ist.psu.edu/viewdoc/download?doi=10.1.1.69.8880&rep=rep1&type=pdf.*

Steiner, Thomas et al., "Adding Realtime Coverage to the Google Knowledge Graph", 2012, 4pgs.

Sterman, John D. "All models are wrong: reflections on becoming a systems scientist", Jay Write Forrester Prize Lecture, 2002, System Dynamics Review, vol. 18, No. 4, (Winter 2002), DOI: 10.1002/sdr.261, (pp. 501-531, 31 total pages).

Schaffer, J. David et al., "Combinations of Genetic Algorithms and Neural Networks: A Survey of the State of the Art", 1992, IEEE, 0-8186-2787-5/92, (pp. 1-37, 37 total pages).

(Continued)

*Primary Examiner* — Chelcie Daye

(74) *Attorney, Agent, or Firm* — Buckley, Maschoff & Talwalker LLC

(57) ABSTRACT

A system includes reception of time-series tuples of a first portion of business data, automatic generation of a weighted graph describing relationships between the time-series tuples, automatic generation of one or more causal loop diagrams based on the relationships and on one or more knowledge models associated with the business data, automatic transformation of each of the one or more causal loop diagrams into a respective state flow diagram, automatic annotation of each of the one or more state flow diagrams with parameters and equations, generation of a simulated system based on the one or more annotated state flow diagrams, and evaluation of the simulated system based on a second portion of the business data.

18 Claims, 6 Drawing Sheets

(56) References Cited

OTHER PUBLICATIONS

Burns, James R. "Converting Signed Digraphs to Forrester Schematics and Converting Forrester Schematics to Differential Equations", IEEE Transactions on Systems, Man, and Cybernetics, vol. SMC-7, No. 10, Oct. 1977, (pp. 695-707, 13 total pages).
Binder, Thomas et al., "Developing Syhstem Dynamics Models from Causal Loop Diagrams", [no date], 21pgs.
Ford, David N. et al., "Expert Knowledge Elicitation to Improve Mental and Formal Models", May 1997, WP#3953-97-MSA, D-4686, (cover 2 +1-32, 34 total pages).
Charles, Alan "Incorporating Soft Variables Into System Dynamics Models: A Suggested Method and Basis for Ongoing Research", [no date], 12pgs.
Granger, C. W. J. "Investigating Causal Relations by Econometric Models and Cross-spectral Methods", Econometrica, vol. 37, No. 3 (Aug. 1969), (cover 1 +pp. 424-438, 17 total pages).
Zhang, Lei "Knowledge Graph Theory and Structural Parsing", 2002, Twente University Press, ISBN: 9036518350, 232 pgs.
Quinn, John A. et al. "Learning of Causal Relations", ESANN 2011 Proceedings, European Symposium on Artificial Neural Networks, Computational Intelligence and Machine Learning, Bruges (Belgium), Apr. 27-29, 2011, 1630c.com publ., ISBN: 978-2-87419-044-5, (pp. 287-296, 10 total pages).
Filipowska, Agata et al., "Organisational Ontology Framework for Semantic Business Process Management", [no date], 12pgs.
Drobek, Marc et al., "Parameter estimation and equation formulation in Business Dynamics", [no date], 12pgs.
Fritzsche, Mathias "Performance related Decision Support for Process Modelling", Apr. 29, 2010, School of Electronics, Electrical Engineering and Computer Science, 280pgs.
Richardson, George P. "Problems for the Future of System Dynamics", [no date], (pp. 1-15, 15 total pages).
Rabelo, Luis et al., "Analysis of Supply Chains Using System Dynamics, Neural Nets, and Eigenvalues", Proceedings of the 2004 Winter Simulation Conference, 2004, 9pgs.
Forrester, Jay W. "System Dynamics and the Lessons of 35 Years", D-4224-4, A Chapter for The Systemic Basis of Policy Making in the 1990s, Apr. 29, 1991, 35pgs.
Ojoawo, Samson O. et al., System Dynamics Modeling of Dumpsite Leachate Control in Ogbomosoland, Nigeria, Journal of Environmental Protection, 2012, vol. 3, (pp. 120-128, 9 total pages), http://dx.doi.org/10.4236/jep.2012.31015.
Medina-Borja, Alexandra et al., "Uncovering complex Relationships in System Dynamics Modeling: Exploring the Use of CART, CHAID and SEM", [no date], (pp. 1-24, 24 total pages).

\* cited by examiner

AUTOMATED ENTERPRISE DYNAMICS SYSTEM

BACKGROUND

The enterprise computing systems of a typical business are becoming increasingly distributed and complex, while also generating increasingly vast amounts of data. The field of business dynamics attempts to model such generated data in order to understand and manage a business based on all relevant variables. In view of the complexity and volume of data, it is quite difficult to capture the relevant variables and identify their influence on one another.

FIG. 1 illustrates known process 100 for operating on enterprise components 110. Enterprise components 110 include domain experts 112 who operate business computing systems 114 and analyze log data 116 generated by systems 114. Modeller 101 initially consults with experts 112 in an attempt to manually capture important processes, strategic goals, and all elements which influence the Key Performance Indicators (KPIs)/goals under study. Due to the limitations of human understanding, modeller 101 then produces a highly simplified and abstracted model of system 114. A large number of relevant variables are generally not considered or captured by the model.

Modeller 101 connects all the captured elements, based on her understanding, in order to create Causal Loop Diagrams (CLDs) 102, which indicate the dependencies among the captured elements. Modeller 101 transforms the CLDs into a State & Flow diagram (SFD) 103, which visualizes the material/resources flowing through system 114. Annotated SFD 105 is then manually generated based on SFD 103 and on available system data 104. Annotated SFD 105 includes manually-created definitions of the parameter values and equations in SFD 103, in order to drive simulated system 106. Generation of annotated SFD 105 therefore requires strong understanding of the target domain and mathematical expertise to determine the parameters and equations. Simulated system 106, driven by annotated SFD 105, generates simulation results 107 for the KPIs under study. Modeller 101 and domain experts 112 manually review (108) and compare the results with the actual behavior of system 114, to identify possible flaws either in the structure of the formal models or their annotated equations. As signified by the dashed arrows of FIG. 1, all steps of process 100 are performed manually with the exception of the simulation of system 106 based on annotated SFD 105.

Process 100 is heavily abstracted, manually-driven, and time-consuming Process 100 is therefore both inaccurate and poorly scalable for today's complex business systems.

DESCRIPTION

The following description is provided to enable any person in the art to make and use the described embodiments. Various modifications, however, will remain readily apparent to those in the art.

Figure 1:
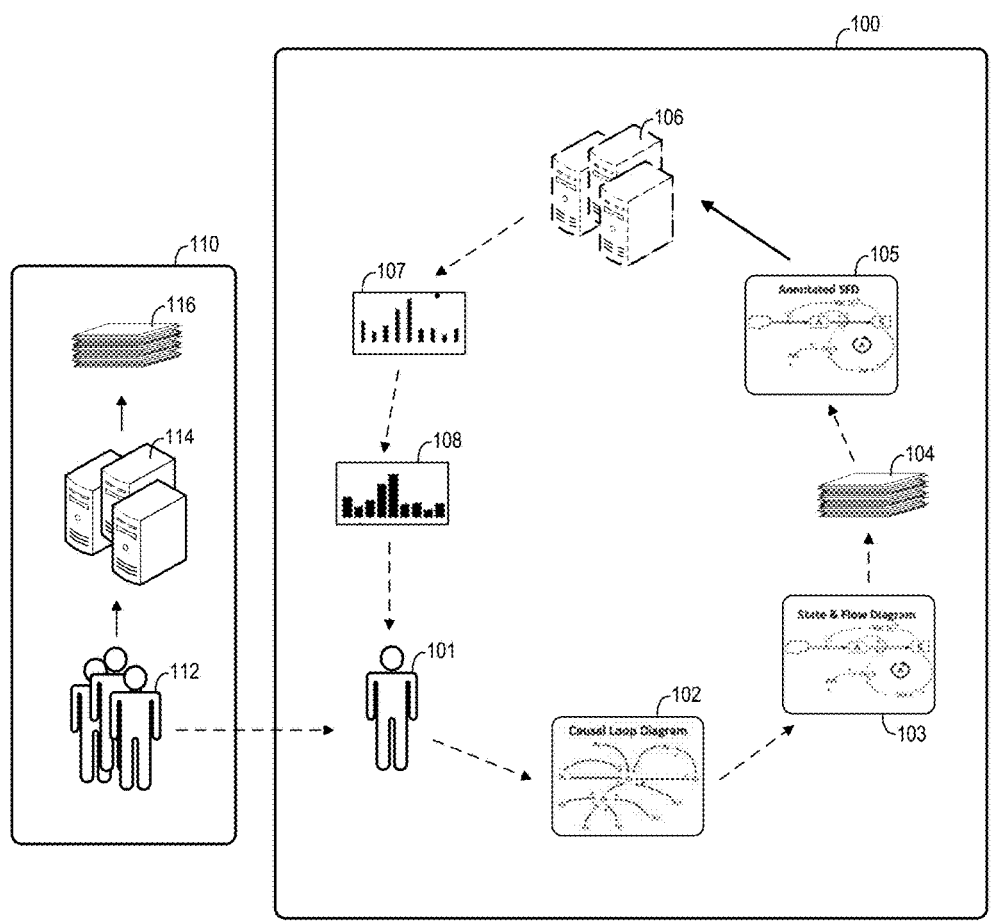
FIG. 1 is a diagram illustrating a business dynamics process.
Figure 2:
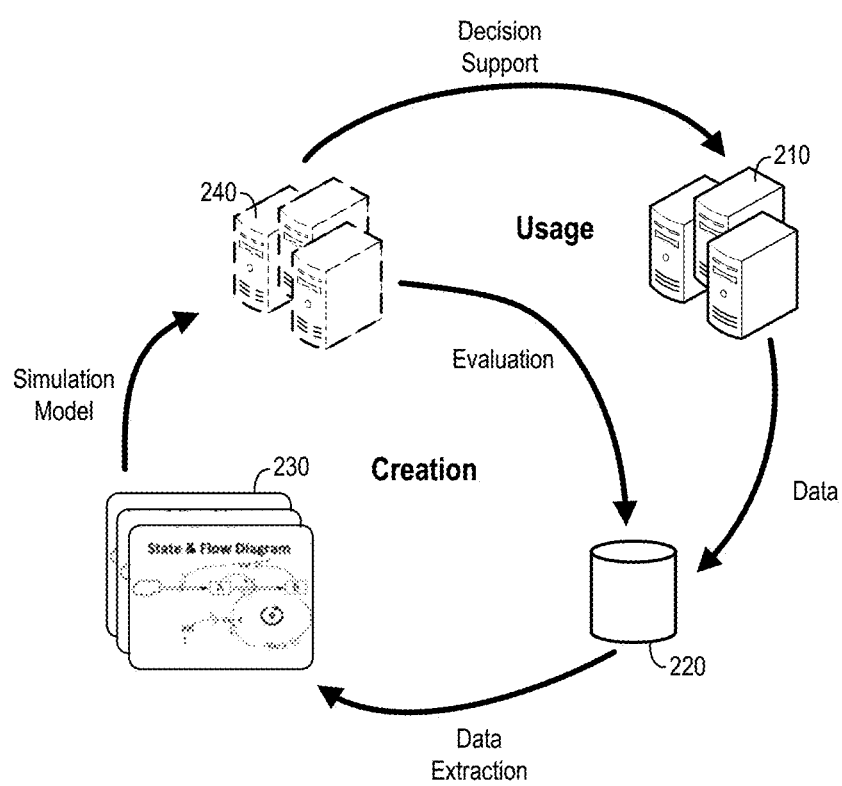
FIG. 2 is a diagram of a business dynamics process according to some embodiments.

Some embodiments relate to automated business dynamics modelling and prediction. FIG. 2 is a general diagram of a business dynamics process according to some embodiments.

Computing system 210 may comprise any system for acquiring, generating and/or storing data. A business may operate computing system 210 to provide one or more business functions. Computing system 210 may comprise any number of computing devices, networks, servers, and client computers, some of which may be located remote from others.

Data source 220 may comprise any one or more data sources storing the above-mentioned data, in structured and/or unstructured formats. The data may, for example, comprise operational, administrative and analytic data. Examples of such data include inventory, sales, billing, human resources, and profit data. Embodiments are not limited thereto.

Data source 220 receives time-series data from computing system 210. As further illustrated, certain ones of the time-series data are extracted to automatically create simulation models 230, such as CLDs and SFDs, by extracting causal indicators with the help of causality and correlation methods, as well as pre-defined domain ontologies. These models are then simulated by simulated system 240 and their results are evaluated via comparison with data 220. The foregoing cycle is labelled Creation in FIG. 2. Multiple iterations of the cycle may be executed until a sufficiently accurate model is obtained. Next, in the Usage cycle, the model is used to provide decision support. Decision support may include predictions of KPIs or answering of original questions regarding the processes of system 210, and therefore regarding the underlying business.

Figure 3:
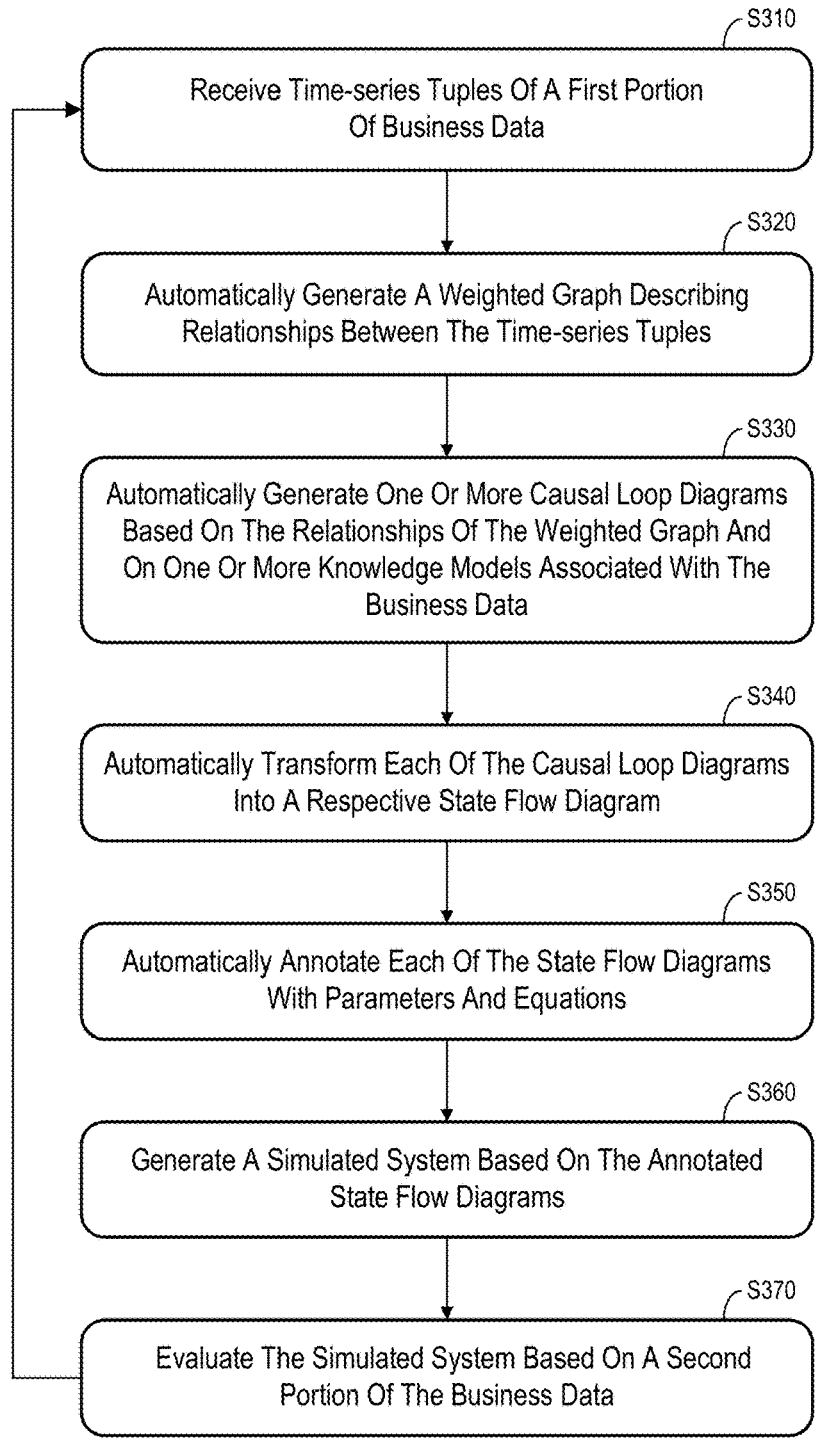
FIG. 3 comprises a flow diagram according to some embodiments.

FIG. 3 comprises a flow diagram of process 300 according to some embodiments. Process 300 may be executed in some embodiments to provide a business dynamics process according to some embodiments. Process 300 may be executed by one or more processing units of one or more computing devices. A processing unit may comprise a processor, a processor core, a processor thread, or the like.

Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, time-series tuples of a first portion of business data are received. The business data may comprise any data received, generated and/or stored by a business computing system.

Figure 4:
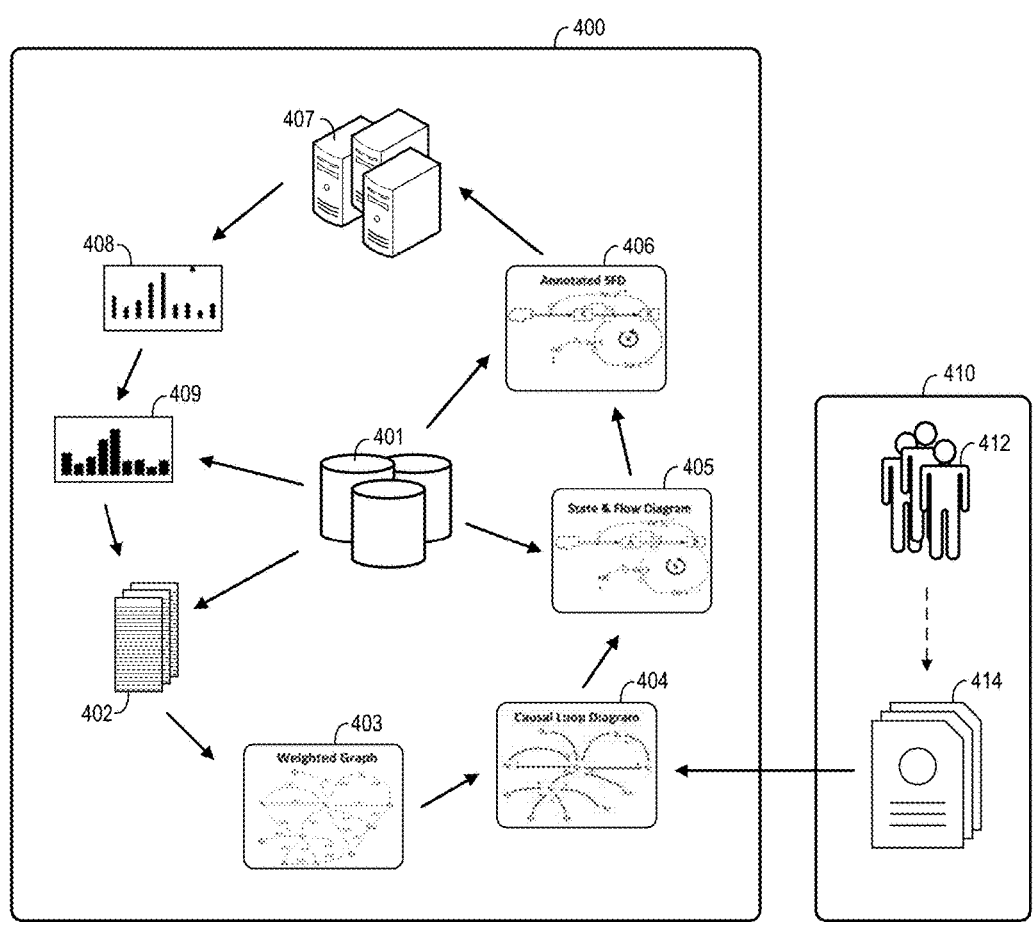
FIG. 4 is diagram of a business dynamics process according to some embodiments.
Figure 5:
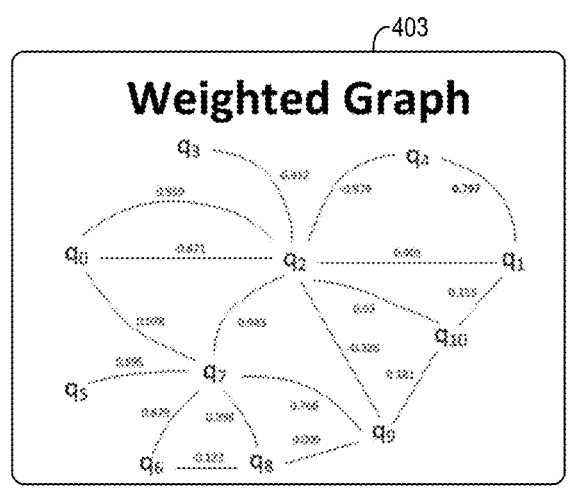
FIG. 5 illustrates a weighted graph of relationships between time-series tuples according to some embodiments.

FIG. 4 illustrates some embodiments of the FIG. 3 process for explanatory purposes. Data sources 401 represents data from which the business data is received at S310. Data sources 401 may be connected to all data sources of a business and thereby store a vast amount of data. Not all of the stored data is relevant, such as, for instance, IDs, primary keys or reference and metadata used to logically connect database tables. S310 may therefore include filtering which attempts to target relevant business data 402 for receipt.

The filtered and received data may be represented as a tuple of different time series' S, where one time series $s_i$ shows the development of exactly one business data entity i (e.g., stock, flow, variable or parameter) over time. Such a time series is therefore a discrete function over time and contains m different time-value tuples $\tau_j$, as shown below.

$$S = (s_0, \ldots, s_n), n \in \mathbb{N}_{>0}$$

$$s_i = (\tau_0, \ldots, \tau_m), m \in \mathbb{N}_{>0}, i \in \mathbb{N}_{[0,n]}$$

$$\tau_j = \begin{pmatrix} t_j \\ o_j \end{pmatrix}, t \in \mathbb{N}_0, o \in \mathbb{R}, j \in \mathbb{N}_{[0,m]}$$

During filtering at S310 according to some embodiments, it is ensured that all time-series are timely ordered. An ordered set of all timestamps T and an ordered set of all observed values O are defined as shown in the functions $T_\tau$, $O_\tau$, $T_s$ and $O_s$ in the equations below. These functions extract either one time-stamp/observed value from a given $\tau_j$ or a complete ordered set of timestamps/observed values from a given time-series $s_i$.

$$T_\tau(\tau_j) = t_j$$

$$T_s(S_i) = (t_0, \ldots, t_m)$$

$$O_\tau(\tau_j) = o_j$$

$$O_s(S_i) = (O_o, \ldots, O_m)$$

Next, at S320, weighted graph 403 is generated. Weighted graph 403 describes relationships between the time-series tuples $s_i$ received at S310. Each time-series tuple reflects a specific component, subcomponent or variable in the target business. The weighted graph conceptualizes a relationship between two variables (tuples) $s_i$ and $s_j$ as a dependency between $s_i$ and $s_j$.

In some embodiments, these dependencies are determined based on concepts of causality and/or correlation. Although many systems for evaluating correlation and causality are known and may be used in conjunction with some embodiments, the description below relates to Pearson correlation and Granger-Causality, for illustrative purposes.

The weighted graph $\Omega$ generated at S320 may include the set of vertices V and the set of rated edges E. Each vertex $v_i$ represents a variable $o_i$ and each edge $e_i$ reflects the relationship between two vertices. Dependent on the selected algorithm selected for determining relationships between all variables O, different weighted graphs may be generated, for instance, a Pearson correlation graph or a Granger-Causality graph.

To assist in the understanding of S320 according to some embodiments, a Pearson correlation graph and two time series $S_0$ and $S_1$ are introduced below.

$$s_0 = (\tau_0, \ldots, \tau_m)$$
$$= \begin{pmatrix} 0 & 2 & 3 & 7 \\ 12.2 & 14.1 & 14.7 & 22.3 \end{pmatrix}$$

-continued $$s_1 = (\tau_0, \ldots, \tau_n)$$
$$= \begin{pmatrix} 1 & 2 & 3 & 4 & 5 & 6 \\ 0.7 & 0.9 & 2.1 & 1.6 & 1.1 & 0.7 \end{pmatrix}$$

Time series $S_0$ and $S_1$ represent observed business-related component, and both are also missing observed values for specific points in time, as indicated by the gaps in the above examples.

To initiate generation of a weighted graph, a correlation function is applied to the observed values of $S_0$ and $S_1$. A general correlation function is defined below, and is used to determine the degree to which a set of variables X correlates to a set of variables Y.

$$cor:(X,Y) \rightarrow [-1.0, 1.0]$$

One example for the correlation function cor(X, Y) is the Pearson product-moment correlation coefficient $\rho$ shown below. This correlation method indicates linear dependency between two given variables X and Y and might therefore not produce optimal results in the case of a non-linear multi-dimensional system.

$$cor_\rho = \rho_{X,Y} = \frac{cov(X,Y)}{\sigma_X \sigma_Y} = \frac{E[(X-\mu_X)(Y-\mu_Y)]}{\sigma_X \sigma_Y}$$

In order to compute this correlation, each data point in X requires a counterpart in Y, in that both data points are associated with the same observation time. In the above example, time series $S_1$ has no registered value for timestamp 0, and time series $S_0$ is missing observed values for the timestamps 1, 4, 5 and 6. Intermediate function $\kappa$ may therefore be created, which ensures that: 1) Each data point in $O_0$ has a counterpart in $O_1$, which has been observed/calculated at the same time; and 2) As implied by Condition 1, the length of the two arbitrary observed data sets is equal.

The function $\kappa$ is applicable to two given time series $S_0$ and $S_1$ and produces a tuple of two sets of observed data points, conforming to the above-defined conditions for correlations. The signature of $\kappa$ and a sample implementation are shown below.

$$\kappa : (s_i, s_j) \rightarrow (O_0, O_1)$$

$$\kappa(s_i, s_j) = (T_s(s_i) \cup T_s(s_j)) \otimes (s_i, s_j)$$
$$= (T_i \cup T_j) \otimes (s_i, s_j)$$
$$= T_{ij} \otimes (s_i, s_j)$$
$$= (O_0, O_1)$$

The sample implementation of $\kappa$ uses a self-defined operator $\otimes$ which works on a set of timestamps and the given time series to identify which observed value in $S_0$ belongs to which value in $S_1$. This operator $\otimes$, along with a sample implementation, is shown below:

$$\otimes : (T_{ij}, (s_i, s_j)) \rightarrow (O_0, O_1)$$

-continued $$T_{ij} \otimes (s_i, s_j) = (T_{ij} \odot s_i, T_{ij} \odot s_j)$$
$$= \left[\left(o_0^{s_i}, \ldots, o_{|T_{ij}|-1}^{s_i}\right),\right.$$
$$\left.\left(o_0^{s_j}, \ldots, o_{|T_{ij}|-1}^{s_j}\right)\right]$$
$$= (O_0, O_1)$$

$$\odot : (T, s) \to O$$

$$T \odot s = \forall\, t_i \in T : \mathcal{L}(t_i, s)$$
$$= (\mathcal{L}(t_0, s), \ldots, \mathcal{L}(t_{|T|-1}, s))$$
$$= (o_0, \ldots, o_{|T|-1})$$
$$= O$$

At this point, a question remains as to how to map or create data points for non-observed timestamps in a given time series S. For example, in the case of above-listed time series $S_1$, what values are to be used for timestamps 0 and 7? This problem is encapsulated by the $\mathcal{L}$ function:

$$\mathcal{L} : (t, s) \to O$$

The implementation of $\mathcal{L}$ calculates the missing content of the observed data sets $O_0$ and $O_1$, which are then used to compute a time-series correlation. Since $\mathcal{L}$ defines the extraction methodology of all observed data points from S, $\mathcal{L}$ may be referred to as a Value Extraction Function (VEF). One example implementation of $\mathcal{L}$ is shown below.

$$\mathcal{L}_{Fix}(t, s) = \begin{cases} t < T_\tau(\tau_0^s) \to O_\tau(\tau_0^s) \\ t < T_\tau(\tau_k^s) \to O_\tau(\tau_{k-1}^s), \\ t \geq T_\tau(\tau_m^s) \to O_\tau(\tau_m^s) \end{cases}$$

$$k \in \mathbb{N}_{>0},\ 1 \leq k \leq m$$

The example VEF returns the first value for each given timestamp t smaller than the first timestamp in s, and the last value for each timestamp greater or equal to the last timestamp in s. For each remaining timestamp t in the interval $T_\tau (\tau_k) \leq t < T_\tau (\tau_{k+1})$, the value $O_\tau (\tau_k)$ will be returned, respectively.

Returning to the time series $S_0$ and $S_1$ set forth above, application of the κ function produces the following results, with the generated content shown underlined:

$$\kappa(s_0, s_1) = (T_s(s_0) \cup T_s(s_1)) \otimes (s_0, s_1)$$
$$= (T_0 \cup T_1) \otimes (s_0, s_1)$$
$$= T_{01} \otimes (s_0, s_1)$$
$$= (O_0, O_1)$$

$$s_0 = (\tau_0, \ldots, \tau_m)$$
$$= \begin{pmatrix} 0 & \underline{1} & 2 & 3 & \underline{4} & \underline{5} & \underline{6} & 7 \\ 12.2 & \underline{12.2} & 14.1 & 14.7 & \underline{14.7} & \underline{14.7} & \underline{14.7} & 22.3 \end{pmatrix}$$

$$s_1 = (\tau_0, \ldots, \tau_n)$$
$$= \begin{pmatrix} \underline{0} & 1 & 2 & 3 & 4 & 5 & 6 & \underline{7} \\ \underline{0.7} & 0.7 & 0.9 & 2.1 & 1.6 & 1.1 & 0.7 & \underline{0.7} \end{pmatrix}$$

$$O_0 = (12.2\ \underline{12.2}\ 14.1\ 14.7\ \underline{14.7}\ \underline{14.7}\ \underline{14.7}\ 22.3)$$
$$O_1 = (\underline{0.7}\ 0.7\ 0.9\ 2.1\ 1.6\ 1.1\ 0.7\ \underline{0.7})$$

The outcome of the κ function is a 2-dimensional tuple $(O_0, O_1)$ whose two ordered sets of observed values are of the same size, and each entry of $O_0$ maps to its exact time-based counterpart in $O_1$. Both $O_0$ and $O_1$ may then be analyzed for correlation by applying a correlation function cor as defined above. A correlation matrix W containing all these correlations may be generated as shown below:

$$W : S \to \mathbb{R}^{(n,n)}$$

$$W(S) = S^T \times S$$
$$= \begin{pmatrix} s_0 \\ \vdots \\ s_n \end{pmatrix} \times (s_0, \ldots, s_n)$$
$$= \begin{bmatrix} \text{cor}(\kappa(s_0, s_0)) & \ldots & \text{cor}(\kappa(s_0, s_n)) \\ \vdots & \ddots & \vdots \\ \text{cor}(\kappa(s_n, s_0)) & \ldots & \text{cor}(\kappa(s_n, s_n)) \end{bmatrix}$$

A weighted graph $\Omega = \{V, E\}$ may then be generated from W(S). As explained above, each time series is reflected as one vertex in V and each edge $e_{ij} \in E$ is associated with the weight $w_{ij}$ from W. $\Omega$ therefore represents the relationships among all the time-series tuples received at S310.

A weighted graph based on Granger-Causality can also be generated at S320 by replacing the Pearson correlation equation with a two-variable Granger-Causality equation. Granger-Causality helps to identify the extent to which one variable is useful in predicting another variable, and is commonly used in statistics together with a Fisher-Test (F-Test) to reject or accept the hypothesis that the incorporation of variable x provides any statistical additional benefit in forecasting variable y. This statement is expressed with hypothesis 1(H1) below. Furthermore, H1 is tested against hypothesis H0, in that x does not help in predicting the future development of y.

$$H1 : y_t = \sum_{i=1}^{i} \alpha_i * y_{t-i} + \sum_{i=1}^{i} \beta_i * x_{t-i} + r_t$$

$$H0 : y_t = \sum_{i=1}^{i} \alpha_i * y_{t-i} + s_t$$

To conduct an F-Test on these two hypotheses, as shown below, the squared residual sum for H1 (RSS 1) and H0 (RSS0) is be computed. RSS0 and RSS 1 can be computed with the help of ordinary least squares, which also creates a parameter configuration for model 1 for H1 and model 0 for H0.

$$F = \frac{(RSS0 - RSS1)/(p1 - p0)}{RSS1/(T - p1)} \sim F_{i, T-p1}$$

$$RSS1 = \sum_{t=1}^{T} r_t^2;$$

$$RSS0 = \sum_{t=1}^{T} s_t^2$$

The result of the F-test is a value in the interval [0.0, -1.0] and is afterwards compared to a critical value. If the result of the F-test is greater than the critical value, one can safely reject H0, and deduce that variable x indeed helps in forecasting variable y.

As shown with the cor method above, each ordered set of observed values ($O_0$, $O_1$), can also be analyzed with the Granger-Causality steps shown above and summarized with function cau, to create a Granger-Causality matrix W.

$$cau: (X, Y) \to [0.0, 1.0]$$
$$W: S \to \mathbb{R}^{(n,n)}$$
$$W(S) = S^T \times S$$
$$= \begin{pmatrix} s_0 \\ \vdots \\ s_n \end{pmatrix} \times (s_0, \ldots, s_n)$$
$$= \begin{bmatrix} cau(\kappa(s_0, s_0)) & \ldots & cau(\kappa(s_0, s_n)) \\ \vdots & \ddots & \vdots \\ cau(\kappa(s_n, s_0)) & \ldots & cau(\kappa(s_n, s_n)) \end{bmatrix}$$

One or more causal loop diagrams 404 are automatically generated at S330 based on the relationships described by the weighted graph generated at S320. As illustrated in FIG. 4, generation of the causal loop diagrams is also based on one or more knowledge models 414 associated with the business data 401. Generally, knowledge models 414 incorporate mental models of domain experts 412 to provide the meaning and semantics of the observed data.

Knowledge models 414 describe known interrelationships between data entities, such as business-related entities. Accordingly, knowledge models 414 may be used at S330 to verify the accuracy of relationships depicted in the weighted graph and the direction of each relationship's causality. The one or more generated causal loop diagrams represent the relationships of weighted graph 403 whose existence and direction are confirmed by the knowledge models 414.

Examples of knowledge models 414 include ontologies and knowledge graphs. Ontologies may capture the semantic knowledge for complete domains (e.g., retail businesses, cities, airplane manufacturers) and are therefore often reusable. Known ontologies include, but are not limited to, a Business Resource Ontology, a Business Functions Ontology, and a Business Goals ontology.

In addition, an ontology may conform to a standardized structure which is suitable for querying (e.g., RDF). For example, SPARQL describes a standard for querying ontologies conforming to RDF, and several frameworks for implementing SPARQL are known. Accordingly, S330 may comprise querying knowledge models 414 to determine whether the relationships depicted in weighted graph 403 are also represented in knowledge models 414.

One specific example of S330 will now be described. First, all available knowledge models are searched for all relationships depicted in Ω. One or more CLDs are created including all matching relationships, and all relationships which are not present in the knowledge models are discarded. The direction of each connection in the CLD(s) is determined from Ω and the directions are also verified by referring to the knowledge models.

The polarity of each connection in the CLD(s) is determined from Ω and the available knowledge models. Polarity (+, −) is annotated to each arrow in the CLD. The polarity indicates whether changes to the independent variable (source) would cause changes in the same direction (+) to the dependent variable (target) or changes in the opposite direction (−). The polarity could be computed from the weighted graph in case of correlation (because polarity is either <0, which means −, or >=0, which means +), and is retrieved from the knowledge models in case of Granger-Causality.

Any missing connection directions and polarities are assigned by a best-guess, alternating, random or other system. In some implementations, if a size of Ω exceeds a threshold, Ω is broken down into sub-components and the above steps are performed for each sub-component.

Each of the one or more CLDs generated at S330 is automatically transformed into a respective SFD at S340. Known automated systems exist for transforming CLDs into SFDs, including but not limited to the Burns MSTM algorithm. Prior to such a transformation, it may be desirable to perform a validation check on the CLDs and the generated SFDs to ensure that both comply to defined meta-models.

Next, at S350, each of the one or more SFDs is automatically annotated with parameters and equations. Conventional methods also exist for such annotation. Methodologies such as machine learning and multi-domain optimization have been demonstrated to beneficially impact this process. Accordingly, neural networks (NN) may be employed as surrogate functions for each missing equation in a previously-created SFD. For each missing equation, a population of NNs is trained with filtered time-series data and furthermore undergoes a process to repeatedly evaluate and change each NN to improve the NN output accuracy with regards to the actual data set. The final result of the process may be a NN that reflects the training data fairly accurately and serves as a function surrogate in the actual SFD.

The final output of the annotation stage is at least one SFD annotated with parameter values and equations such that an existing simulation engine (e.g., Vensim or Stella) can be deployed to run simulations based thereon. The SFD model may be transformable into any tool-specific input, making it simulation tool-independent.

A simulated system is generated at S360 using the at least one annotated SFD and a simulation engine. Each discrete simulation event is used as one cycle, in that all SFD elements are recalculated in one discrete event for time-stamp t+1.

At step S370, the simulated system is evaluated based on a second portion of the business data. That is, the simulated system output is evaluated based on data which is different from the data used to create the simulated system. The goal of this evaluation is to verify whether the automatically-created models accurately reflect the actual behavior of the underlying business system. The evaluation may be performed using functions, such as the least squares method, to detect the simulation result deviation from the actual measured historical data. The computed deviation may then be used to calculate a metric to determine to what extent the generated models conform to the input data. Based on the conformance, flow may stop or return to S310 to re-iterate in an attempt to create "better" results.

Some embodiments may therefore automatically create better business models and predictions by incorporating more available data sources and minimizing dependence on domain expert knowledge.

Figure 6:
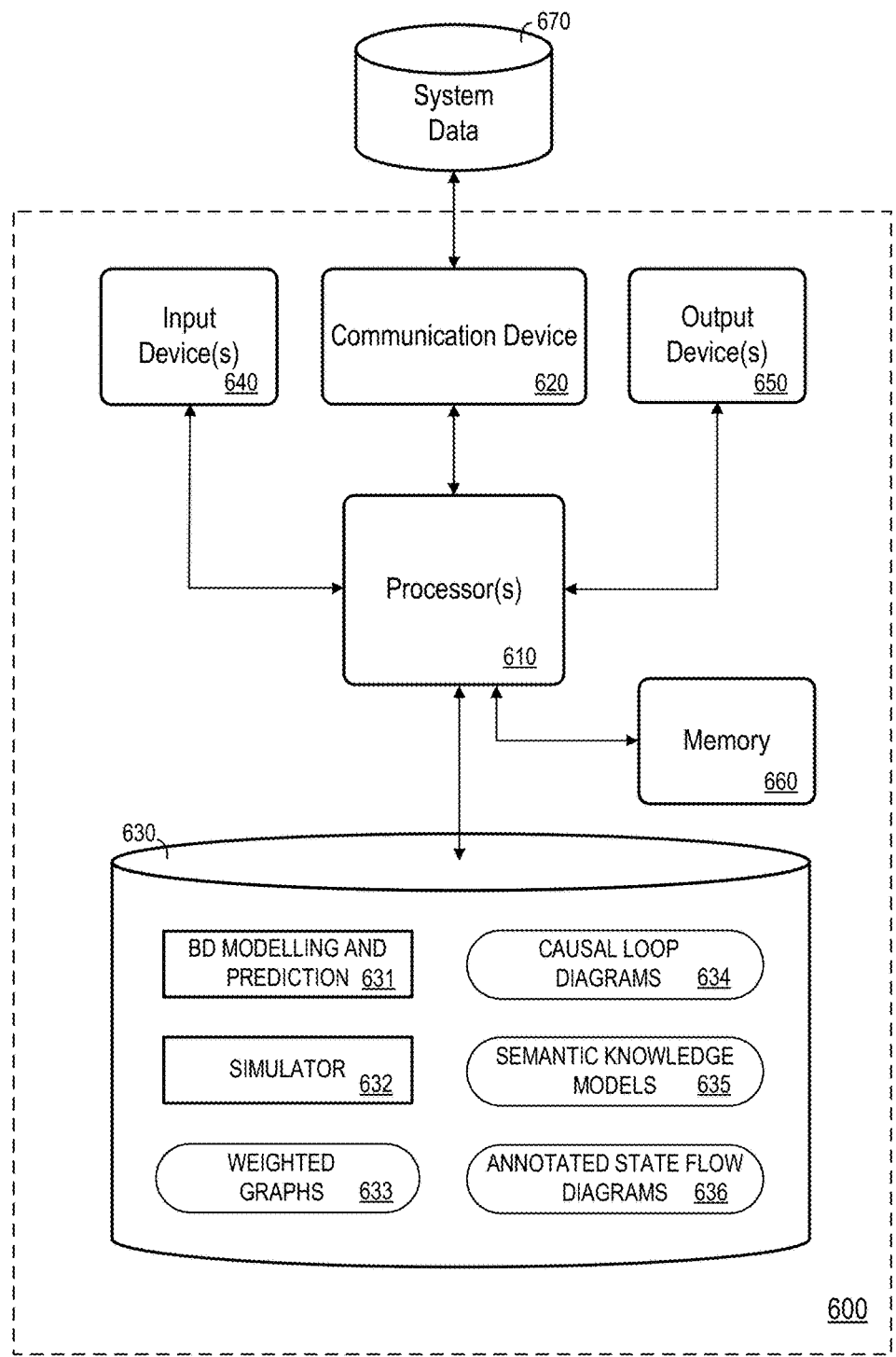
FIG. 6 is a block diagram of a computing apparatus according to some embodiments.

FIG. 6 is a block diagram of system 600 according to some embodiments. System 600 may comprise a general-purpose computing system and may execute program code to perform any of the processes described herein. System 600 may comprise an implementation of system 400 according to some embodiments. System 600 may include other unshown elements according to some embodiments.

System 600 includes processors 610 operatively coupled to communication device 620, one or more input devices 640, one or more output devices 650, and data storage device 630. Communication device 620 may receive time-series tuples from system data source 670 as described above. Input device(s) 640 may comprise, for example, a keyboard, a keypad, a mouse or other pointing device, a microphone, knob or a switch, an infra-red (IR) port, a docking station, and/or a touch screen. Output device(s) 630 may comprise, for example, a display (e.g., a display screen) a speaker, and/or a printer.

Memory 660 may comprise Random Access Memory which may store processor-executable process steps for execution by processor(s) 610.

Data storage device 630 may comprise any appropriate persistent storage device, including combinations of magnetic storage devices (e.g., magnetic tape, hard disk drives and flash memory), optical storage devices, Read Only Memory (ROM) devices, Non-Volatile Random Access Memory, or the like.

Business dynamics modelling and prediction 631 may comprise program code executable by processor(s) 610 to cause system 600 to perform the process of FIG. 3 and/or any one or more of the processes described herein. Simulator 632 may comprise program code executable by processor(s) 610 to provide a simulated system based on annotated SFDs generated via execution of business dynamics modelling and prediction 631.

Data storage device 630 also stores data generated and/or used by business dynamics modelling and prediction 631, including weighted graphs 633, causal loop diagrams 634, semantic knowledge models 635 and the aforementioned annotated state flow diagrams. Data storage device 630 may also store other data and program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of a system according to some embodiments may include one or more processors to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
   a memory storing processor-executable process steps; and
   one or more processors to execute the process steps to cause the computing system to:
   receive time-series tuples of a first portion of business data from a data source of a computing system;
   automatically generate a weighted graph describing relationships between the received time-series tuples;
   automatically generate one or more causal loop diagrams based on the relationships described in the weighted graph and on one or more knowledge models associated with the received time-series tuples;
   automatically transform each of the one or more causal loop diagrams into a respective state flow diagram;
   automatically annotate each of the one or more state flow diagrams with parameters and equations;
   generate a simulated system based on the one or more annotated state flow diagrams;
   evaluate an output behavior generated by the simulated system based on a second portion of the business data, the second portion of the business data being different than the first portion of the business data; and
   generate a metric based on the evaluation to verify an extent to which the simulated system accurately reflects a behavior of a system represented by the business data.

2. A computing system according to claim 1, wherein automatic generation of the weighted graph comprises:
   application of a correlation function to the time-series tuples.

3. A computing system according to claim 2, wherein automatic generation of the weighted graph comprises:
   based on a first two time-series tuples including different numbers of data points, generation of a second two time-series tuples including a same number of data points, where each data point of a first one of the second two time-series tuples is associated with a same time as one data point of a second one of the second two time-series tuples, and
   wherein the correlation function is applied to the second two time-series tuples.

4. A computing system according to claim 1, wherein automatic generation of the weighted graph comprises:
   based on a first two time-series tuples including different numbers of data points, generation of a second two time-series tuples including a same number of data points, where each data point of a first one of the second two time-series tuples is associated with a same time as one data point of a second one of the second two time-series tuples.

5. A computing system according to claim 1, wherein automatic generation of the weighted graph comprises:
   application of a causality function to the time-series tuples.

6. A computing system according to claim 1, wherein automatic generation of the one or more causal loop diagrams comprises:
   querying of the one or more knowledge models to determine whether any of the knowledge models include the relationships.

7. A method executable by a computing device in response to execution of processor-executable program code, the method comprising:
   receiving time-series tuples of a first portion of business data from a data source of a computing system;

automatically generating a weighted graph describing relationships between the received time-series tuples;

automatically generating one or more causal loop diagrams based on the relationships described in the automatically generated weighted graph and on one or more knowledge models associated with the received time-series tuples;

automatically transforming each of the one or more causal loop diagrams into a respective state flow diagram;

automatically annotating each of the one or more state flow diagrams with parameters and equations;

generating a simulated system based on the one or more annotated state flow diagrams;

evaluating an output behavior generated by the simulated system based on a second portion of the business data, the second portion of the business data being different than the first portion of the business data; and generating a metric based on the evaluation to determine an extent to which the simulated system accurately reflects a behavior of a system represented by the business data.

8. A method according to claim 7, wherein automatically generating the weighted graph comprises:

applying a correlation function to the time-series tuples.

9. A method according to claim 8, wherein automatically generating the weighted graph comprises:

based on a first two time-series tuples including different numbers of data points, generating a second two time-series tuples including a same number of data points, where each data point of a first one of the second two time-series tuples is associated with a same time as one data point of a second one of the second two time-series tuples, and wherein the correlation function is applied to the second two time-series tuples.

10. A method according to claim 7, wherein automatically generating the weighted graph comprises:

based on a first two time-series tuples including different numbers of data points, generating a second two time-series tuples including a same number of data points, where each data point of a first one of the second two time-series tuples is associated with a same time as one data point of a second one of the second two time-series tuples.

11. A method according to claim 7, wherein automatically generating the weighted graph comprises:

applying a causality function to the time-series tuples.

12. A method according to claim 7, wherein automatically generating the one or more causal loop diagrams comprises:

querying the one or more knowledge models to determine whether any of the knowledge models include the relationships.

13. A non-transitory computer-readable medium storing program code, the program code executable by a computing device to cause the computing device to:

receive time-series tuples of a first portion of business data from a data source of a computing system;

automatically generate a weighted graph describing relationships between the received time-series tuples;

automatically generate one or more causal loop diagrams based on the relationships described in the automatically generated weighted graph and on one or more knowledge models associated with the received time-series tuples;

automatically transform each of the one or more causal loop diagrams into a respective state flow diagram;

automatically annotate each of the one or more state flow diagrams with parameters and equations;

generate a simulated system based on the one or more annotated state flow diagrams;

evaluate the simulated system based on a second portion of the business data, the second portion of the business data being different than the first portion of the business data; and generate a metric based on the evaluation to determine an extent to which the simulated system accurately reflects a behavior of a system represented by the business data.

14. A medium according to claim 13, wherein automatic generation of the weighted graph comprises:

application of a correlation function to the time-series tuples.

15. A medium according to claim 14, wherein automatic generation of the weighted graph comprises:

based on a first two time-series tuples including different numbers of data points, generation of a second two time-series tuples including a same number of data points, where each data point of a first one of the second two time-series tuples is associated with a same time as one data point of a second one of the second two time-series tuples, and wherein the correlation function is applied to the second two time-series tuples.

16. A medium according to claim 13, wherein automatic generation of the weighted graph comprises:

based on a first two time-series tuples including different numbers of data points, generation of a second two time-series tuples including a same number of data points, where each data point of a first one of the second two time-series tuples is associated with a same time as one data point of a second one of the second two time-series tuples.

17. A medium according to claim 13, wherein automatic generation of the weighted graph comprises:

application of a causality function to the time-series tuples.

18. A medium according to claim 13, wherein automatic generation of the one or more causal loop diagrams comprises:

querying of the one or more knowledge models to determine whether any of the knowledge models include the relationships.

* * * * *